United States Patent
Archer

(10) Patent No.: US 9,095,902 B2
(45) Date of Patent: Aug. 4, 2015

(54) HOT ISOSTATIC PRESSING

(75) Inventor: Geoffrey Frederick Archer, Lincolnshire (GB)

(73) Assignee: ADVANCED INTERACTIVE MATERIALS SCIENCE LIMITED, Peterborough (GB)

( * ) Notice: Subject to any disclaimer, the term of this patent is extended or adjusted under 35 U.S.C. 154(b) by 0 days.

(21) Appl. No.: 13/518,603

(22) PCT Filed: Dec. 22, 2010

(86) PCT No.: PCT/GB2010/052186
§ 371 (c)(1),
(2), (4) Date: Sep. 11, 2012

(87) PCT Pub. No.: WO2011/077150
PCT Pub. Date: Jun. 30, 2011

(65) Prior Publication Data
US 2013/0071627 A1    Mar. 21, 2013

(30) Foreign Application Priority Data

Dec. 23, 2009 (GB) .................................. 0922488.2

(51) Int. Cl.
| | | |
|---|---|---|
| B22F 3/15 | (2006.01) | |
| B22F 3/24 | (2006.01) | |
| B22F 5/10 | (2006.01) | |
| B01J 8/00 | (2006.01) | |
| B32B 1/00 | (2006.01) | |
| B64C 25/00 | (2006.01) | |
| C22C 38/00 | (2006.01) | |
| F04C 2/10 | (2006.01) | |

(52) U.S. Cl.
CPC . *B22F 3/15* (2013.01); *B01J 8/008* (2013.01); *B22F 3/24* (2013.01); *B22F 5/10* (2013.01); *B32B 1/00* (2013.01); *B64C 25/001* (2013.01); *C22C 38/00* (2013.01); *F04C 2/10* (2013.01); *Y10T 428/24628* (2015.01)

(58) Field of Classification Search
CPC ......................................................... B22F 3/15
USPC ..................................... 419/49, 5, 6, 8, 10, 13
See application file for complete search history.

(56) References Cited

U.S. PATENT DOCUMENTS

| | | | | |
|---|---|---|---|---|
| 5,864,744 | A * | 1/1999 | Bigay ............................. | 419/29 |
| 5,956,561 | A * | 9/1999 | Bugle et al. ..................... | 419/49 |
| 6,939,508 | B2 * | 9/2005 | Bampton et al. .................. | 419/5 |
| 7,112,301 | B2 * | 9/2006 | Thorne et al. .................... | 419/5 |

(Continued)

FOREIGN PATENT DOCUMENTS

| | | |
|---|---|---|
| GB | 2 416 544 | 2/2006 |
| WO | WO 2009/066082 | 5/2009 |
| WO | WO 2009/115821 | 9/2009 |

OTHER PUBLICATIONS

International Search Report for PCT/GB2010/052186, mailed Jul. 27, 2011, (Liu, Yonghe).

*Primary Examiner* — George Wyszomierski
*Assistant Examiner* — Ngoclan T Mai
(74) *Attorney, Agent, or Firm* — Nixon & Vanderhye P.C.

(57) ABSTRACT

A process is provided for producing a component. The process comprising the steps of: producing a former corresponding to the internal dimensions of the component to be formed; providing a layer of a second material on at least one surface of the former; locating the former in a containment and filling the containment with a first material; subjecting the containment to hot isostatic pressing such that the second material diffuses into the first material.

17 Claims, 4 Drawing Sheets

(56) References Cited

U.S. PATENT DOCUMENTS

| | | | |
|---|---|---|---|
| 7,407,622 B2 * | 8/2008 | Voice et al. | 419/5 |
| 2008/0115358 A1 * | 5/2008 | Rice et al. | 29/889.21 |
| 2011/0033725 A1 | 2/2011 | Archer | |
| 2011/0038750 A1 | 2/2011 | Archer | |

* cited by examiner

HOT ISOSTATIC PRESSING

This application is the U.S. national phase of International Application No. PCT/GB2010/052186, filed 22 Dec. 2010, which designated the U.S. and claims priority to GB Application No. 0922488.2, filed 23 Dec. 2009, the entire contents of each of which are hereby incorporated by reference.

The invention relates to Hot Isostatic Pressing techniques and, in addition, to certain products produced using these improved techniques.

Many industrial processes are undertaken in a hostile environment either as a result of the elevated pressure, extremes of temperature, pH, abrasion and/or corrosion. These conditions limit the lifetime of the vessels in which these processes are carried out. The choice of material from which such vessels are made is dictated by the process conditions that will be experienced. However, the most resilient materials are also often the most expensive materials and therefore the choice of material is typically a trade off between expense and lifespan.

One example of such a process is catalytic cracking of high molecular weight hydrocarbons to produce fuel oils. This process is typically operated at around 1100° C. in high temperature, high Chromium steel tubes where fine powdered catalyst particles are mixed with the long chain hydrocarbons. The catalyst particles coke and are removed for regeneration by reduction. The tubes in which the reactions are carried out are also affected by the carbon present and this can result in a condition known as green rot. This limits the useful lifetime of the tubes in which the catalytic cracking takes place.

Green rot is the carburisation of steel that occurs as a result of the super saturation of the basic steel grain structure with carbon. Once the grain structure has been saturated, further carbon can be deposited at grain boundaries which can, if left unchecked, result in the fracture of the tube. The threshold temperature for carburisation of steel is in the region of 800° C. which is well below the standard operating temperature of the catalytic crackers.

As tubes can only be changed out of a catalytic cracker when it has been shutdown, the lifetime of the tubes is a limiting factor in the time between shutdowns. Furthermore, because fracture in a single tube and cause damage to adjacent tubes and also to other parts of the plant, the tubes are changed out well in advance of the end of their theoretical lifespan in order to guard against unplanned shutdowns.

Currently, tubes for use in catalytic crackers undergo a complex manufacture process that typically consists of a metal billet being cast with a hole in it. The cast piece is forged into a tube about 2 m in length and, if the hole was not created during the casting process, it may be created during forging. The tube is then forged with a tool through the bore in order to create longitudinal grooves in the bore. In order to create a spiral involute from the straight grooves, the tube is heated and twisted. The outside diameter in the region of 125 mm to 160 mm is then turned and a plurality of 2 m lengths are welded together to create the full length tube assembly which may be 10 m in length.

A further example of a process undertaken in a hostile environment is the mud motors and progressive cavity pumps used in various applications including sub-sea drilling, pumping out marine diesel, oil or other products. In a mud motor a central cavity is filled with high pressure mud. In a progressive cavity pump, the fluid being pumped may be at high pressure. The conduit of either the pump or motor is typically straight, but it must be capable of adopting a curvature in the region of 1:100. This raises stresses as one side of the tube is under tensile stress whilst the other side is under compression. In order to minimise the joints which are natural stress raisers, the mud motor and progressive cavity pump tubes are typically quite long.

A different example of a hostile environment is bearings that operate under considerable tensile stresses. For example, in the aircraft industry the undercarriage undergoes considerable stresses as an aircraft comes into land. The bearing within the aircraft leg must be both light and capable of withstanding very high stresses in use.

A further example of an article that is typically subjected to considerable stresses is the dies used in extrusion processes. Extrusion is a technique that can be applied create constant cross sectional area products in a variety of materials including polymers, rubber and wood-based composites. The dies used typically comprise an outer block with a cut-out portion which is proportioned to provide the desired shape in the material extruded therethrough. The block must have high mechanical strength to withstand the pressures of the extrusion process.

A process that can be used to form components is Hot Isostatic Pressing (HIP). Hot Isostatic Pressing is a single stage process which results in net-shape or near-net shape components being formed from metal powders which are confined within a mould cavity and subject to isostatic pressing.

A HIP process results in a substantially homogeneous substance and it is known to use Boron Nitride as a diffusion barrier to prevent the material from the mould, or any insert that is provided within the mould to define further structural features of the component to be formed, from moving by atomic diffusion into the metal powder being consolidated by the HIP process.

The present invention has arisen in order to address at least some of the problems set out above in connection with operating in a hostile environment. Described herein are components formed from a first material and having at least one surface that has an altered surface structure as a result of a second material having been diffused into the first material. The first material may be a metal or metal alloy, and the components may be made from compressed metal powders. The metal may be a ferrous metal, titanium, nickel, nickel alloy or aluminium. The components may be produced using a net or near-net shaped manufacturing process, and be of a substantial size, for example at least 2 meters in length.

Enabling a second material to diffuse into the first material is advantageous because it provides enables the concentration of the second material to alter gradually with distance from the surface of the component. As a result there is no single defined boundary between the two materials which prevents the layer of the second material shearing away from the first material under process conditions. Rather than forming a separate coating or layer on the surface of a component made of the first material, the surface structure of the component may be altered using the processes described herein. The components produced may thus not carry a separate coating of a second material, but may have the second material diffused into the surface of the first material.

According to the present invention there is provided a catalytic cracker tube formed from a first material and having at least one surface that has an altered surface structure as a result of a second material having been diffused into the first material.

Enabling a second material to diffuse into the first material from which the catalytic cracker tube is formed is advantageous because it provides enables the concentration of the second material to alter gradually with distance from the surface of the tube. As a result there is no single defined boundary between the two materials which prevents the layer of the second material shearing away from the first material under process conditions.

The catalytic cracker tube may be formed by a HIP process. The first and second materials are subject to the HIP process together so that the internal shape of the tube is dictated by the shape of a former provided within the containment in which the HIP process takes place. As a result, the provision of the second material does not require a subsequent process step and also does not result in a change in the shape of the tube. The HIP process provides a net or near-net shaped component and therefore the process is therefore easily capable of forming catalytic cracker tubes within the required accuracy of around +/−0.5 mm.

The catalytic cracker tube may be provided with a spiral involute. The provision of a spiral involute increases the surface area and also increases turbulence, thus promoting the mixing of the catalyst with the reactants within the tube.

The second material may include boron. Ferro-boride is known to resist carburisation of steel. However, ferro-boride is also very unstable and therefore it cannot be introduced in this form. The second material may therefore include boron and at least one stabilising agent. During the HIP process, the boron will diffuse into the steel and form ferro-boride with some of the iron within the steel.

The second material may include Aluminium and the first material may be a ferrous material. During the HIP process the Aluminium will react with the iron to form Ferro-aluminide which strongly resists carburisation.

Furthermore according to the present invention there is provided a segment for use in a mud motor or progressive cavity pump, the segment being formed from a first material and having at least one surface that has an altered surface structure as a result of a second material having been diffused into the first material.

The segment for the mud motor or progressive cavity pump may be formed by a HIP process. The mud motor or cavity pump needs to be formed to an accuracy of +/−20 μm (microns) and this is compatible with the HIP process.

Whether the segment is intended for use in a mud motor or a progressive cavity pump, it may be provided with a convex domed end and a concave domed end. The convex ends of the segments have the same radius as the concave domed ends so that when two segments are provided adjacent to one another the convex domed end of a first segment interfaces with the concave domed end of a second segment. In this way there is a considerable area of surface contact. The domed ends of the segments also enable the segments to rotate relative to one another so as to provide a comparatively small radius of curvature for the mud motor or cavity pump as a whole.

The segment may be provided with a collar adjacent the convex domed end. The collar may have a radius in the region of 1 mm larger than the radius of the body of the segment. There may also be provided a collar adjacent the concave domed end. Between the collars and the respective ends there may be a short shoulder portion that is configured to ensure that, as the segments rotate relative to one another, the edge of the domed end does not foul the outer shell.

The interior of each segment may be provided with a spiral involute to facilitate the flow of mud through the motor or fluid through the pump.

A plurality of segments may be arranged adjacent and may be contained within an outer shell. The outer shell may be in the region of 20 m long and each segment may be in the region of 1 m long. The provision of a plurality of segments within an outer shell enables a modular approach to maintenance in that only segments showing signs of wear need to be replaced during any given maintenance cycle. This differs considerably from the state of the art where mud motors are formed from a relatively small number of pieces, for example five, welded together. Because there is no weld between adjacent segments according to the present invention undamaged segments can be reintroduced into the outer shell. In use, the collar of each segment interfaces with the inner surface of the outer shell. This ensures that the body of the segment is not in contact with the outer shell as this would result in considerable compressive and tensile forces as a result of the curvature of the outer shell.

The outer shell may be of steel, such as US 4140 alloy steel or EN24 and the segments may be of a nickel based alloy such as Sagitite®. Steel has a co-efficient of thermal expansion of $11.5\text{-}13\times10^{-6}$ depending on the grade of the steel. In contrast Sagitite® has a co-efficient of thermal expansion of $9\times10^{-6}$ and therefore the mud motor may be constructed by introducing a plurality of segments into a steel outer shell at temperature, closing the outer shell with end caps and then allowing the mud motor to cool. As a result of the differences in coefficient of thermal expansion, the steel will contract further and will encapsulate the segments securely within the outer shell.

Furthermore according to the present invention there is provided an undercarriage leg for an aircraft, the leg being formed from a first material and having at least one surface that has an altered surface structure as a result of a second material having been diffused into the first material. An undercarriage leg for an aircraft requires high stiffness in compression.

The first material may be a titanium alloy and the second material may be titanium diboride. The titanium alloy may be $TiAl_6V_4$. Titanium cannot be heat treated to give stiffness as it strongly absorbs other compounds at temperature. The titanium diboride diffuses through the top 3 mm of the surface where it creates a complex network of intermetallic phases.

The undercarriage leg may be formed by a HIP process. Subsequent to the HIP process, the outer surface may be isothermally forged in order to provide a finished outer surface.

Furthermore according to the present invention there is provided a die for use in an extruder, the die being formed from a first material and having at least one surface that has an altered surface structure as a result of a second material having been diffused into the first material.

The first material may be a medium strength alloy, for example of steel. This helps to reduce the weight and cost of the die overall. The second material may then be a much harder alloy capable of withstanding the pressures of the extrusion process.

The die may be made by the HIP process using a series of concentric fillers to provide layers of first, second and possibly third and even fourth materials. A former may be provided to ensure that the die is produced as a net-shape in the HIP process. Alternatively, if the die is not net-shape when the HIP process has been completed then the through-hole can be subsequently machined to perfect the shape.

Furthermore according to the present invention there is provided a process for producing a component, the process comprising the steps of: producing a former corresponding to the internal dimensions of the component to be formed; providing a layer of a second material on at least one surface of the former; locating the former in a containment and filling the containment with a first material; subjecting the containment to hot isostatic pressing such that the second material diffuses into the first material.

The provision of a second material that is specifically intended to diffuse into the first material represents a paradigm shift in HIP processes. Currently if a second material is provided at all, it is provided specifically to prevent diffusion into the component to be formed.

The first and/or second materials may be metal powders. Alternatively, the second material may be a specified ceramic, for example to provide a wear surface for a steel component. For example, zirconium cannot diffuse into steel, but nickel can diffuse into steel. Therefore, a surface of affnium stabilised zirconia can be provided on a steel component by incorporating nickel into the second material in addition to the zirconia.

The provision of a second material can result in a change in the choice of first material in comparison with current practices with regard to a given component. The diffusion of a second material into the first material means that the properties of the component are no longer solely dictated by the material from which the bulk of the component is made. As a result, a more economical material can be selected as the first material provided that the surface layer formed in situ between the first and second materials provides the surface properties required of the component as a whole.

The former may be removed from the component after the HIP process. The former may be of carbon or steel. Carbon is easy to machine and remove. Furthermore, it is comparatively stable and predictable. Carbon is therefore suitable for steel components. In contrast, the carbon would diffuse into a titanium component and therefore for a titanium component a steel former may be used. The difference in thermal expansion coefficients between steel and titanium means that a steel former will be release easily from a titanium component once the containment enclosing the component and the former has been cooled.

The second material may include Boron Nitride and Chromium. The second material may be thermally sprayed, plasma sprayed, aqueous sprayed or deposited by vapour phase deposition onto the former.

The first material may be a Nickel alloy such as Sagitite®. The Chromium and the carbon will diffuse into the low alloyed first material in order to provide a higher volume fraction of $Cr_{23}C_6$ near to the surface than within the core of the component. The $Cr_{23}C_6$ will be generated in situ to create a pin structure that increases the wear resistance and surface hardness of the completed component.

The second material may include Nickel and the first material may include aluminium. During the HIP process the Nickel will react with the aluminium to form Nickel aluminide. This is particularly appropriate for applications such as pistons where the Nickel improves the surface properties of the aluminium component.

The second powder diffuses through the top 1000 μm to 2000 μm (i.e. 1-2 mm) of the component.

The second powder may have a plurality of constituent parts that may be applied homogeneously or in a stratified manner. Each constituent part of the second powder will diffuse into the first powder in accordance with its own material properties. The constituent parts of the second powder may react with one another as well as with the first powder in order to create species that may not have been present independently before the HIP process.

The HIP step of the process of producing a component may include the step of raising the temperature to a predetermined value and then holding the temperature at that predetermined value in order to stress release the powders. The temperature may be held for 1½ hours, although it may be held for as little as 1 hour or up to 4 hours. The time may be chosen according to the extent of grain growth which is desirable in the component being fabricated. For example, in ferrous and Aluminium based materials, grain growth will become excessive if the containment is maintained at temperature for extended periods.

The predetermined value of temperature is set to be appropriate for the containment which may be, for example, made from steel which has been welded and therefore is plastic at 720° C. enabling total stress relief for the containment.

The present invention will now be described in further detail with reference to the accompanying drawings which are provided by way of example only.

Figure 2:
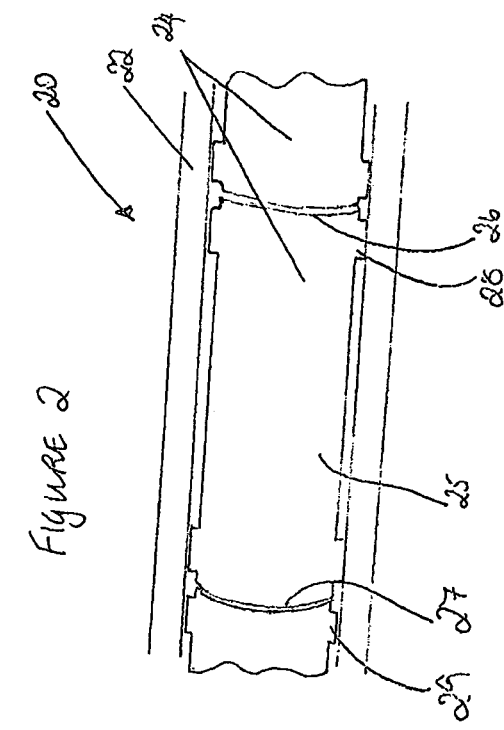
FIG. 2 shows a mud motor or cavity pump comprising a plurality of segments according to the present invention.
Figure 3B:
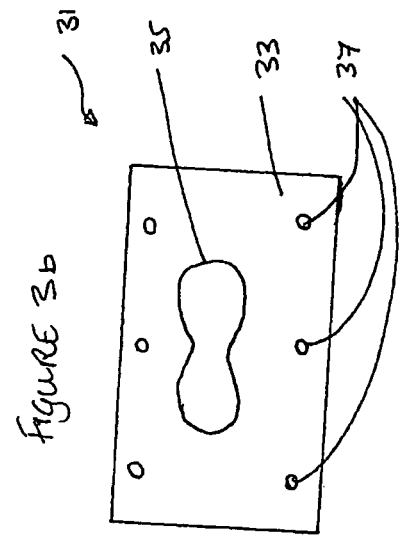
Figure 1:
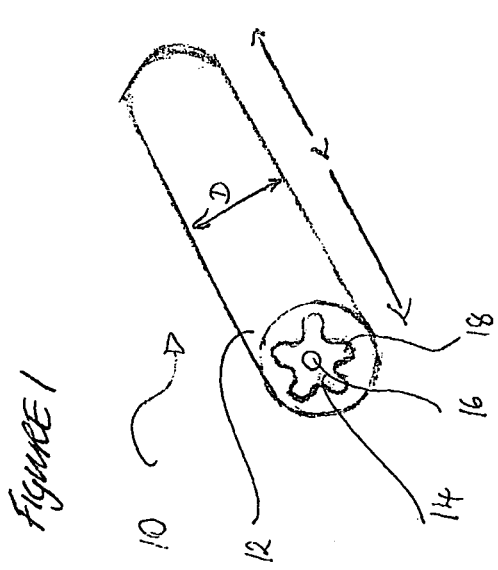
FIG. 1 shows a catalytic cracker tube according to the present invention.
Figure 3A:
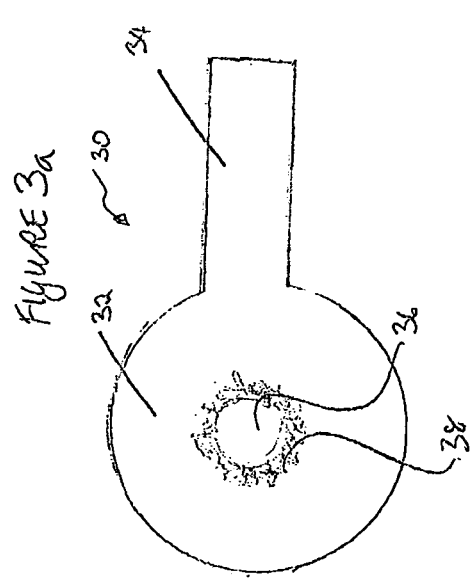
Figure 4:
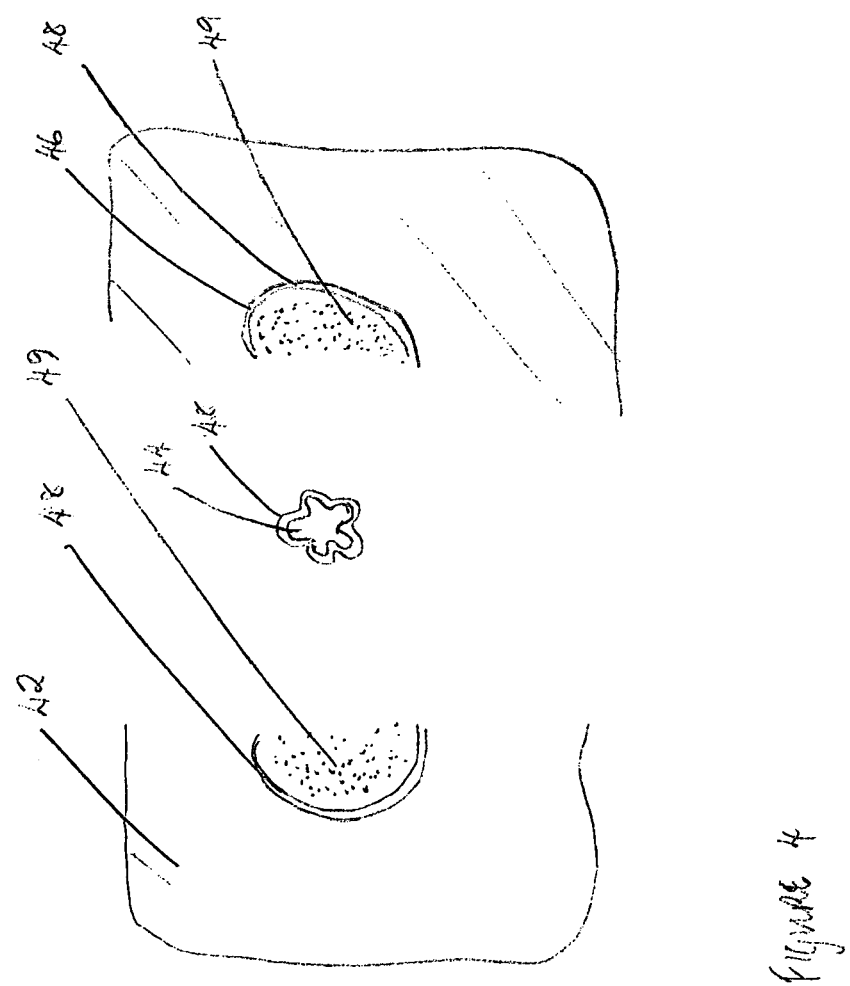
Figure 5:
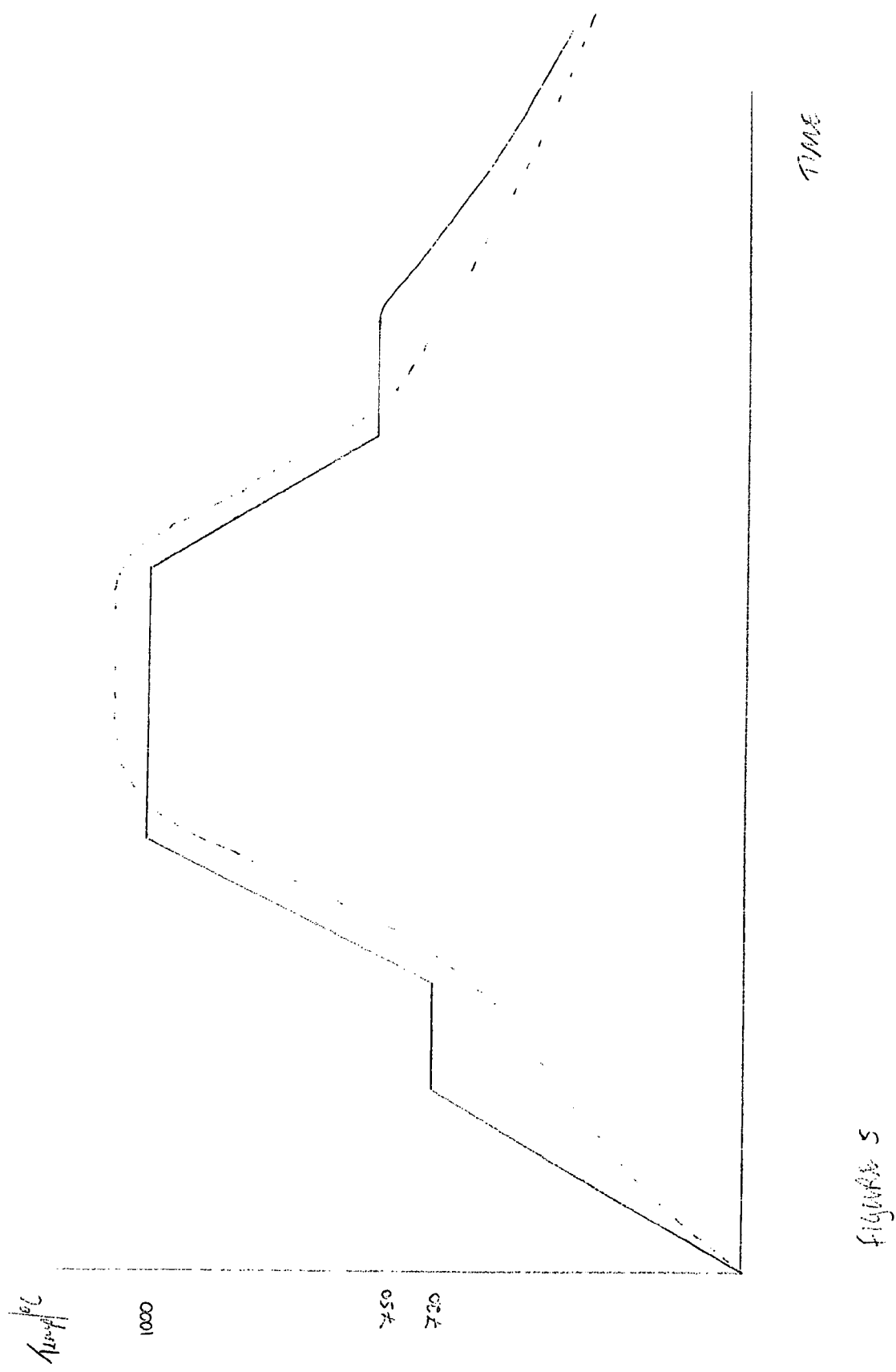
Figure 6B:
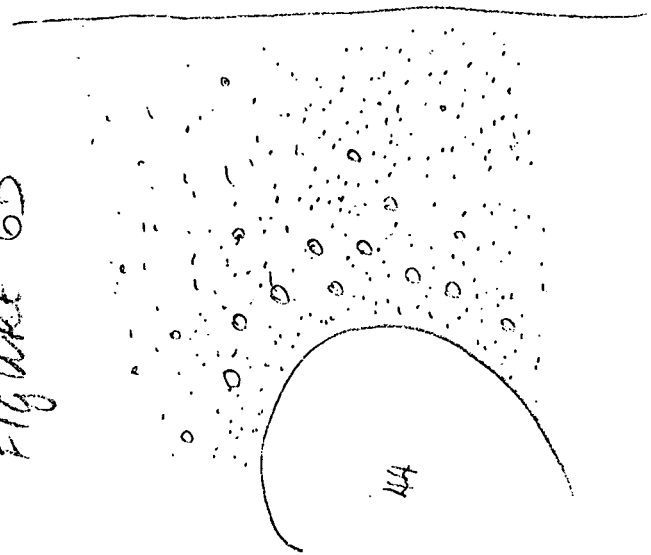
Figure 6A:
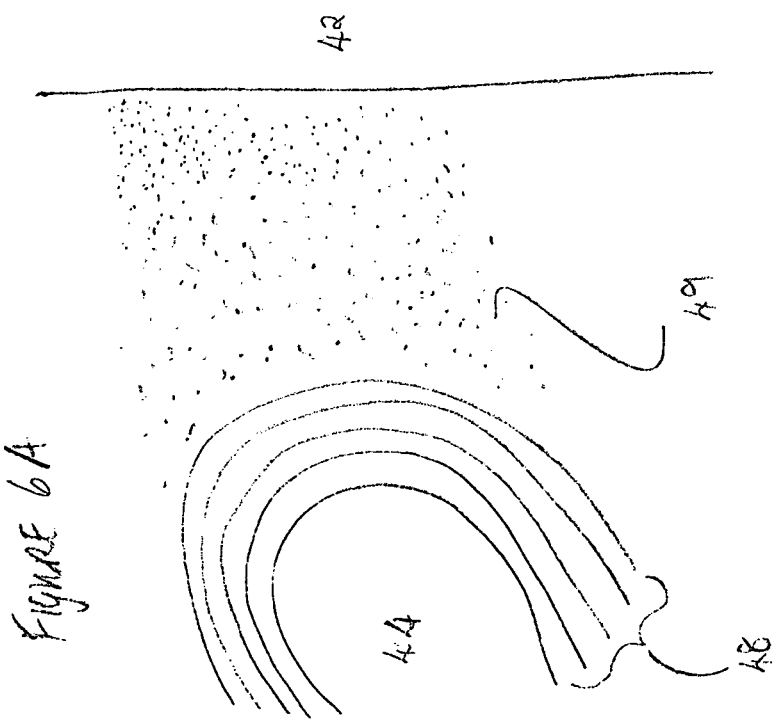

FIG. 3*a* shows an aircraft undercarriage leg according to the present invention;

FIG. 3*b* shows a die for use in extrusion according to the present invention;

FIG. 4 shows an exploded view of the constituent parts required to produce a component such as those illustrated in FIGS. 1 to 3 above using the process according to the present invention;

FIG. 5 is a temperature and pressure profile of the conditions during the HIP process; and FIGS. 6A and 6B are schematic illustrations of a cross section through the materials before and after the HIP process.

FIG. 1 shows a catalytic cracker tube 10 according to the present invention. The tube 10 has a length L of 2 m and a diameter D in the range of 125 mm to 160 mm. In use a set of five tubes 10 will be joined together to provide a total process length of 10 m.

The tube 10 is cylindrical and has an outer surface 12 and internal geometry 14. The outer surface 12 is substantially smooth to facilitate the tube 10 being laid adjacent other tubes within a catalytic cracker. The internal geometry 14 includes a central bore 16 and a spiral involute 18. The spiral involute encourages turbulent flow resulting in the mixing of the reactants with the catalyst resulting in more efficient cracking than could be obtained in laminar or near-laminar flow conditions.

FIG. 2 shows a segmented mud motor or progressive cavity pump 20 that has an outer shell 22 and a plurality of segments 24. Each of the segments 24 has a body 25, a concave domed end 26 and a convex domed end 27. Adjacent the domed ends 26, 27 are provided a pair of collars 28, 29. The segments 24 have a length of 1 m and a radius of 120 mm. In an alternative example, not shown in the accompanying drawings, the length is 1.5 m and the diameter 200 mm.

The provision of the domed ends 26, 27 enable the segments to move relative to one another. In the illustrated example has a radius of curvature considerably larger than the diameter of the segment 24. Although this limits the extent of movement between adjacent segments, it also manages the pressures placed on the outer shell 22. The outer shell 22 is made of steel has an inner radius that conforms closely with the outer radius of the collars 28, 29 of the segments 24. The diameter of the circle of which the domed shape of ends 26, 27 forms a part is dictated by the maximum bend radius of the completed mud motor or cavity pump, which is typically 1 m in 100 ft. The diameter may be reduced to provide a tighter bend, but the tighter the radius, the greater the stress on the outer shell.

The body 25 has a diameter of 1 mm less than the diameter of the collars 28, 29 so that collars are in contact with the outer shell 22 whereas the body 25 remains out of contact in order to avoid the considerable tensile and compressive stresses that would be experienced if body 25 were sized to be in contact with the body 25 along its length.

The collars 28, 29 are positioned at least 1 mm from the domed ends 26, 27 so that the edge of the domed end cannot foul the outer shell 22 as the segments 24 rotate relative to one another within the shell 22.

A spiral involute (not shown) runs through the centre of the segment 24. The involute may have five flutes, although it may have more flutes, up to nine or eleven. Alternatively, it may have fewer flutes. The diameter of the route through each of the flutes has a diameter in the region of 15 to 25 mm and the diameter will be, at least in part, dictated by the number of flutes and the diameter of the segment 24 as a while.

FIG. 3a shows an aircraft undercarriage leg 30 that has a circular foot part 32 and an elongate leg portion 34. The leg 30 is formed of titanium. At the centre of the foot part 32 there is an opening 36 through which a bearing passes, in use. The inner surface 38 of the foot part 32 is subject to diffusion from a second material that is capable of altering the surface morphology of the leg 30 to incorporate a complex network of intermetallic phases that result in the surface being considerably more wear resistant than a leg that had not been thus treated.

FIG. 3b shows an example of a die 31 for use in an extrusion process. The die 31 comprises an outer block 33 cut through by a shaped surface 35. The shape of the surface 35 matches the desired shape of the product to be extruded from the die. The surface 35 is formed predominantly from the second material that is more resilient to the stresses associated with the extrusion. The bulk of the outer block 33 is formed from a lighter alloy. The outer block 35 comprises through holes 37 . . .

FIG. 4 shows the steps in making a component such as a catalytic cracker tube 10 or the segments 24 for use in a segmented mud motor 20 or an aircraft undercarriage leg 30 using the process according to the present invention. In the first step, a containment 42 and a former 44 are produced. The containment 42 is configured to have an internal surface 46 that may correspond to the desired external surface of the component to be formed or at least encompasses the maximum size of the component to be formed. The former 44 is shaped to correspond to the internal geometry of the component. For example, in the case of the catalytic cracker tube described above with reference to FIG. 1, or the segments 24 for the segmented mud motor 20 described above with reference to FIG. 2, the former 44 would be shaped as a spiral involute. The former 44 is typically carbon when the component is steel because carbon is relatively stable and predicable under HIP conditions.

A coating step follows in which either the inner surface 46 of the containment or the former 44 are coated with one or more coatings. The former 44 is coated with boron nitride which is conventionally used in a HIP process to prevent carbon from the former 44 from migrating during the HIP process into the component being formed. In addition the former 44 is coated with one or more layers of material which are intended to diffuse into the surface layer of the component to be formed. These layers or coatings 48 may be provided as pastes, gels, isolated on tapes provided in an organic binder. The organic binder is then removed before the HIP step. The coatings 48 may be provided over the entirety of the former 44 or only over a portion of the former 44. This allows different surface to have different surfaces properties. This ensures that expensive compounds are only introduced where they are required, rather than being provided over the entire surface of the component. A plurality of layers of material may be provided on the former 44. For example two, three, four, five, six, eight, twelve or even thirty-two layers may be provided. Where multiple layers are provided, the order of the layers is selected according to the preferred extent of diffusion as some layers will inhibit the constituents of other layers from diffusing into the component during the HIP process.

Alternatively, rather than providing discrete layers of second material, in an alternative example that is not illustrated in the accompanying drawings, a number of constituents may be provided in a single homogenous coating and the differences in diffusion characteristics of the various constituents will enable different constituents to diffuse by differing amounts through the first material. Depending on the choice of constituents in the homogenous coating, one or more constituents may diffuse through the first material without reacting with the first material. Others may form new substances in situ, those new substances being subject to a concentration gradient related to the diffusion characteristics of the constituent introduced in the coating.

If the external surface of the component to be formed requires its morphology to be altered by the diffusion of other materials into the HIP process and if the containment is configured to match closely the external configuration of the component to be formed, then these materials are provided on the inner surface 46 of the containment 42. As the containment 42 is not carbon, there is no need for a boron nitride layer to prevent the carbon from migrating into the component to be formed. Furthermore, the coatings 48 used on the inner surface 46 of the containment 42 may differ from those provided on the former 44.

Once the containment 42 and the former 44 have been provided with coatings the former 44 is placed in the containment 42 and the containment 42 is filled with a powder 49 of the predominant material from which the component is to be formed. The containment 42 is then closed and subjected to Hot Isostatic Pressing such that the coatings 48 diffuse into a surface layer of the component formed. Depending on the substances in the coatings 48, the surface layer may extend up to 2 mm. The substances within the coatings 48 may migrate within the component and may remain chemically identical. However, this technique is most effective in the situation where the substances in the coatings 48 react with the powder 49 in the surface region to produce different alloys at a concentration which varies with distance from the former 44.

Once the containment has been depressurised and returned to ambient temperature, the component is removed from the containment 42 and the former 44 is removed from the component. If the former 44 is carbon then it may be machined out. If the former is steel and the component is predominantly titanium, then the former 44 will typically be loose by the time the containment has regained ambient temperature and pressure. If the former 44 is copper than it may be electrolytically etched out of the finished component.

If the containment 42 is not configured to conform closely to the shape of the finished component then the component may be further treated once the former has been removed. For example the component may be isothermally forged, if it is titanium or it may be turned if it is steel.

The heating and cooling regimen used in the HIP process is designed to maximise the opportunities for stress relief from the component being formed and also to enable the coatings 48 to diffuse into the surface layer of the component. A schematic of the temperature (solid line) and pressure (dashed line) is given in FIG. 5.

Initially the temperature and pressure are increased at a ramp rate of around 10° C./minute until the temperature reaches a hold temperature. The temperature is maintained at the hold point for an hour in order to allow stress to be released. The hold temperature is in the region of 720° C. for a welded steel containment.

Once the stress release step has been completed the temperature and pressure are increased to in the region of 80% solidus. This occurs at 1000° C. for Nickel and 1090° C. for Steel and at this temperature and pressure hot isostatic pressing occurs. The duration of the HIP process is determined by the sectional thickness of the component being formed and the grain size of the powder from which the component is being formed.

When the HIP process has been completed the temperature is reduced at a ramp rate of between 3 and 10° C./minute until the temperature reaches a second predetermined value. The temperature is maintained at this second value for in the region of 1 hour. The temperature depends on the predominant material in the component. For example, it will typically be between 750° C. and 720° C. although it may be as high as 800° C. for a Nickel alloy or as low as 540° C. for a high Chromium steel.

By holding the temperature at this second predetermined value, the surface layers provided will diffuse through the component. Phase changes within the component occur during this hold step.

After the diffusion hold has been completed, the temperature can be reduced. This is done slowly, at no more than 3° C./minute in order to enable the component to release stress to the former. In this way, the stress within the finished component is minimised.

The temperature is held once during the cooling, at the first predetermined value in order to allow stress to release from the completed component into the containment and the former. Temperature and pressure subsequently reduce together until they reach ambient conditions.

FIGS. 6A and 6B show, schematically, the distribution of coatings 48 before and after the HIP process, respectively.

The invention claimed is:

1. A process for producing a component, the process comprising the steps of: producing a former corresponding to the internal dimensions of the component to be formed; providing a layer of a second material on at least one surface of the former; locating the former in a containment and filling the containment with a first material; subjecting the containment to hot isostatic pressing such that the second material diffuses into the first material, wherein there is no single defined boundary layer between the second material and the first material.

2. The process according to claim 1, wherein the former is removed from the component after the hot isostatic pressing (HIP) process.

3. The process according to claim 1, wherein the first and/or second materials are metal powders.

4. The process according to claim 1, wherein the second material is a ceramic.

5. The process according to claim 1, wherein the second material is thermally sprayed, plasma sprayed, aqueous sprayed or deposited by vapour phase deposition onto the former.

6. The process according claim 1, wherein the first material is a Nickel alloy.

7. The process of claim 6, wherein the Nickel alloy has a co-efficient of thermal expansion of $9 \times 10^{-6}$.

8. A process for producing a component, the process comprising the steps of: producing a former corresponding to the internal dimensions of the component to be formed; providing a layer of a second material on at least one surface of the former; locating the former in a containment and filling the containment with a first material; subjecting the containment to hot isostatic pressing such that the second material diffuses into the first material, wherein the second material includes Boron Nitride and Chromium.

9. A process for producing a component, the process comprising the steps of: producing a former corresponding to the internal dimensions of the component to be formed; providing a layer of a second material on at least one surface of the former; locating the former in a containment and filling the containment with a first material; subjecting the containment to hot isostatic pressing such that the second material diffuses into the first material, wherein the second material includes Nickel and the first material includes aluminium.

10. A process for producing a component, the process comprising the steps of: producing a former corresponding to the internal dimensions of the component to be formed; providing a layer of a second metal powder on at least one surface of the former; locating the former in a containment and filling the containment with a first metal powder; subjecting the containment to hot isostatic pressing such that the second metal powder diffuses into the first metal powder, wherein the second powder diffuses through the top 1000 μm to 2000 μm of the component.

11. A process for producing a component, the process comprising the steps of: producing a former corresponding to the internal dimensions of the component to be formed; providing a layer of a second material on at least one surface of the former; locating the former in a containment and filling the containment with a first material; subjecting the containment to hot isostatic pressing such that the second material diffuses into the first material wherein the hot isostatic pressing step of the process of producing a component includes the step of raising the temperature to a predetermined value and then holding the temperature at that predetermined value in order to stress release the materials.

12. A process for producing a component, the process comprising the steps of: producing a former corresponding to the internal dimensions of the component to be formed; providing a layer of a second material on at least one surface of the former; locating the former in a containment and filling the containment with a first material; subjecting the containment to hot isostatic pressing such that the second material diffuses into the first material, wherein the second material has a plurality of constituent parts that are applied homogeneously and wherein the hot isostatic pressing step of the process of producing a component includes the step of raising the temperature to a predetermined value and then holding the temperature at that predetermined value in order to stress release the materials.

13. The process according to claim 12, wherein the former is removed from the component after the HIP process.

14. The process according to claim 12, wherein the first and/or second materials are metal powders.

15. The process according to claim 12, wherein the second material is a ceramic.

16. The process according to claim 12, wherein the second material is thermally sprayed, plasma sprayed, aqueous sprayed or deposited by vapour phase deposition onto the former.

17. The process according claim 12, wherein the first material is a Nickel alloy.

* * * * *